United States Patent
Connor et al.

(10) Patent No.: US 7,466,306 B2
(45) Date of Patent: Dec. 16, 2008

(54) MULTI-DISPLAY COMPUTER SYSTEM AND METHOD

(75) Inventors: Thomas J. Connor, Longmont, CO (US); David B. Hanson, Fort Collins, CO (US); Charles R. Shilling, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 619 days.

(21) Appl. No.: 10/834,148

(22) Filed: Apr. 27, 2004

(65) Prior Publication Data

US 2005/0237269 A1   Oct. 27, 2005

(51) Int. Cl.
*G06F 3/02* (2006.01)
*G09G 5/00* (2006.01)

(52) U.S. Cl. .................... 345/169; 345/1.1; 345/156; 345/168

(58) Field of Classification Search .................. 345/1.1, 345/1.2, 1.3, 156, 168, 169
See application file for complete search history.

(56) References Cited

U.S. PATENT DOCUMENTS

| | | | |
|---|---|---|---|
| 5,038,301 A * | 8/1991 | Thoma, III .................. 345/3.3 |
| 5,796,577 A * | 8/1998 | Ouchi et al. ................. 361/681 |
| 5,847,698 A * | 12/1998 | Reavey et al. ............... 345/173 |
| 5,900,848 A | 5/1999 | Haneda et al. |
| 6,094,341 A * | 7/2000 | Lin ............................. 361/681 |
| 6,295,038 B1 * | 9/2001 | Rebeske ...................... 345/1.1 |
| 6,343,006 B1 * | 1/2002 | Moscovitch et al. ........ 361/681 |
| 6,487,068 B1 | 11/2002 | Rahemtulla |
| 6,532,146 B1 | 3/2003 | Duquette |
| 6,667,877 B2 | 12/2003 | Duquette |
| 6,667,878 B2 | 12/2003 | Ponx |
| 6,670,950 B1 * | 12/2003 | Chin et al. ................... 345/173 |
| 6,909,597 B2 * | 6/2005 | Tutikawa ..................... 361/681 |
| 6,919,864 B1 * | 7/2005 | Macor ......................... 345/1.1 |
| 7,127,776 B2 * | 10/2006 | Park ............................. 16/239 |
| 7,136,282 B1 * | 11/2006 | Rebeske ...................... 361/683 |
| 2005/0134524 A1 * | 6/2005 | Parker et al. ................. 345/1.1 |

* cited by examiner

*Primary Examiner*—My-Chau T Tran

(57) ABSTRACT

A multi-display computer system comprises a display member rotatably coupled to a base member. The display member has a first display device disposed on an interior surface thereof and a second display device disposed on an exterior surface thereof. The computer system also comprises a display manager executable by a processor and adapted to enable a user to automatically control a display mode of the second display device independent of a display mode of the first display device.

36 Claims, 3 Drawing Sheets

MULTI-DISPLAY COMPUTER SYSTEM AND METHOD

BACKGROUND

Notebook, laptop, and other types of portable personal computing devices generally comprise a single, flat screen display. Although a single display is generally adequate for the person using the computer, business conferences, instructional environments, and other types of use scenarios benefit from an additional display to prevent repeated turning of the computing device for viewing by others or having others look over the shoulder of the user. However, additional displays also increase the power consumption of the computing device.

SUMMARY OF THE INVENTION

In accordance with one embodiment of the present invention, a multi-display computer system comprises a display member rotatably coupled to a base member. The display member has a first display device disposed on an interior surface thereof and a second display device disposed on an exterior surface thereof. The computer system also comprises a display manager executable by a processor and adapted to enable a user to automatically control a display mode of the second display device independent of a display mode of the first display device.

In accordance with another embodiment of the present invention, a computer display method comprises controlling a display mode associated with a first display device where the first display device is disposed on an interior surface of a display member. The method also comprises enabling automatic control of a display mode associated with a second display device disposed on an exterior surface of the display member independent of the display mode of the first display device.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
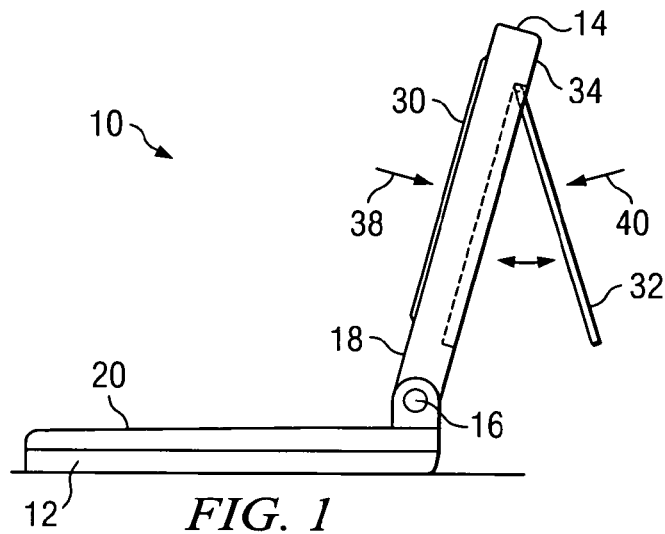
FIG. 1 is a diagram illustrating an embodiment of a multi-display computer system in accordance with the present invention.
Figure 2:
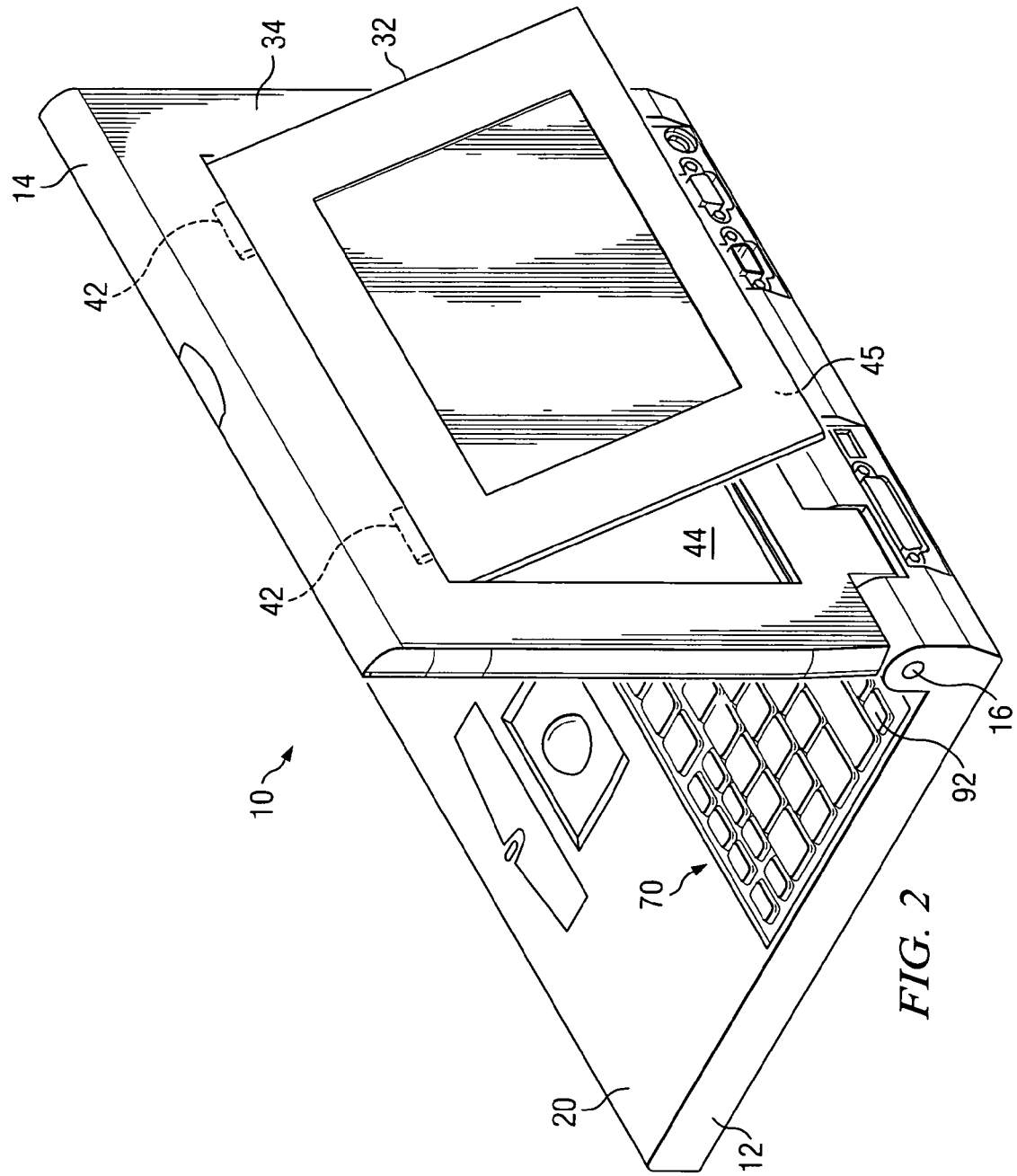
FIG. 2 is another diagram illustrating a perspective view of the embodiment of the multi-display computer system illustrated in FIG. 1.

FIG. 1 is a diagram illustrating an embodiment of a multi-display portable computer system 10 in accordance with the present invention, and FIG. 2 is another diagram illustrating portable computer system 10 of FIG. 1. In the embodiment illustrated in FIGS. 1 and 2, portable computer system 10 comprises a base member 12 and a display member 14 rotatably coupled to base member 12. For example, in the embodiment illustrated in FIGS. 1 and 2, display member 14 is coupled to base member 12 via a hinge assembly 16 to enable rotational movement of display member 14 relative to base member 12 such that an interior surface 18 of display member 14 may be rotated toward an interior surface 20 of base member 12.

In the embodiment illustrated in FIGS. 1 and 2, portable computer system 10 also comprises an interior display device 30 disposed on interior surface 18 of display member 14, and an exterior display device 32 coupled to an exterior surface 34 of display member 14. Display devices 30 and 32 may comprise any type of device for displaying image content such as, but not limited to, a liquid crystal display (LCD). In operation, display device 30 enables a user of computer system 10 to view image content displayed on display device 30 from a position or orientation indicated generally by 38. Additionally, display device 32 enables others to view image content displayed on display device 32 from a direction or orientation indicated generally by 40. Thus, in operation, display devices 30 and 32 are disposed on opposite sides of display member 14 to enable viewing of image content displayed on display devices 30 and 32 from opposite sides of display member 14, thereby facilitating classroom, lecture, instructional, or other uses of computer system 10.

Referring to FIG. 2, exterior display device 32 is rotatably coupled to display member 14 via a plurality of ratchet-type hinge assemblies 42 to enable exterior display device 32 to be positioned at different viewing orientations relative to display member 14. However, it should be understood that a greater or fewer quantity of hinge assemblies 42 may be used to rotatably secure display device 32 to display member 14. Further, it should be understood that other types of devices or methods may be used to couple exterior display device 32 to display member 14 to facilitate variable positioning of display device 32 relative to display member 14 to facilitate optimum viewing of image content displayed on display device 32 corresponding to different viewing directions relative to display member 14.

In the embodiment illustrated in FIGS. 1 and 2, display member 14 also comprises a recessed area 44 to facilitate a recessed storage position of exterior display device 32 within display member 14. For example, in the embodiment illustrated in FIGS. 1 and 2, exterior display device 32 may be rotated toward display member 14 such that display device 32 is positioned within recessed area 44, thereby further reducing or substantially eliminating a likelihood of damage occurring to display device 32. In some embodiments, recessed area 44 is sized having a depth to accommodate placement of display device 32 within recessed area 44 such that an exterior surface 45 of display device 32 is disposed below surface 34 of display member 14 to substantially prevent or eliminate a likelihood of damage occurring to display device 32. However, it should be understood that recessed area 44 may be otherwise configured. Additionally, it should be understood that system 10 may be configured without recessed area 44.

Figure 3:
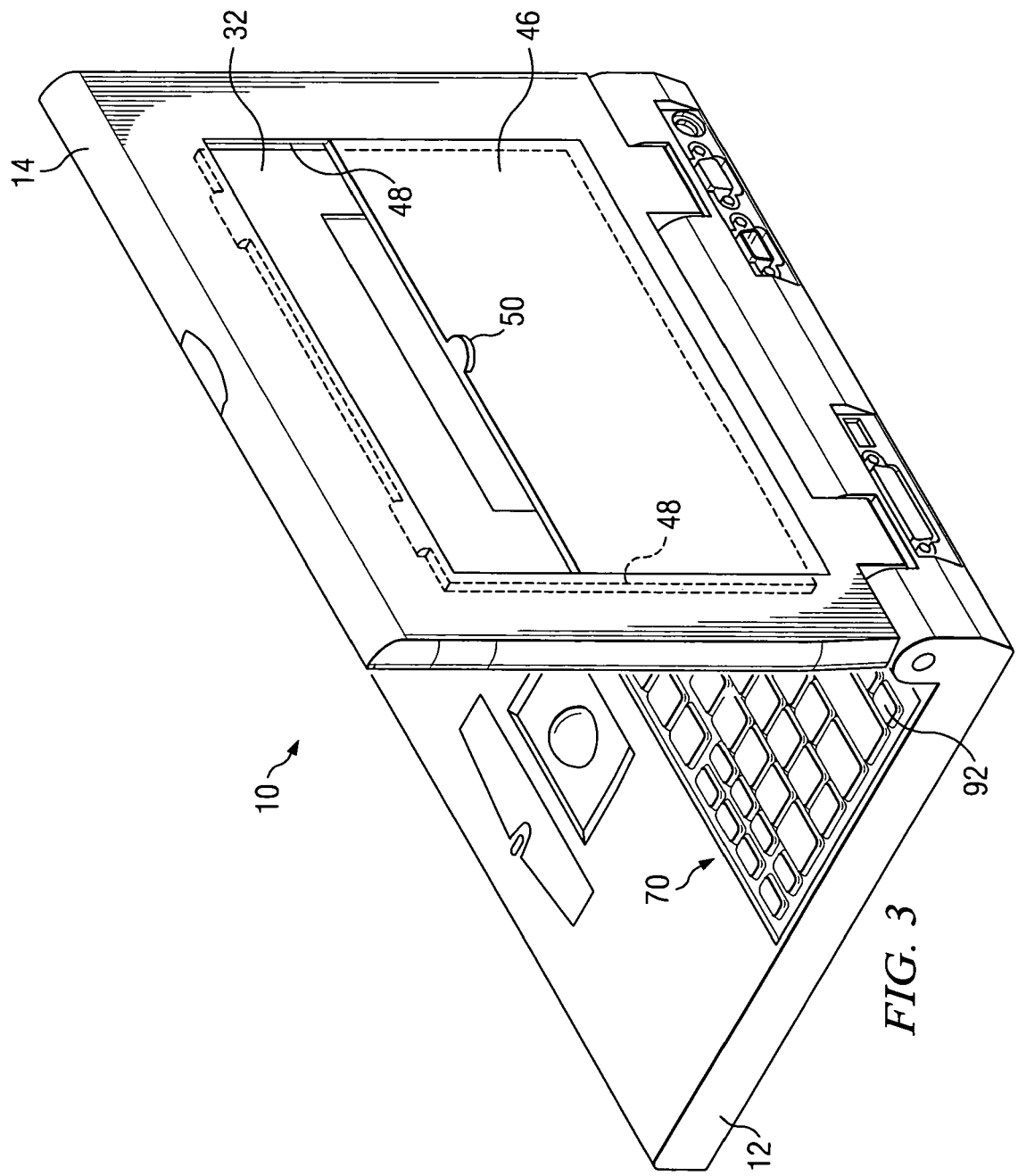
FIG. 3 is a diagram illustrating another perspective view of the multi-display computer system illustrated in FIGS. 1 and 2.

FIG. 3 is a diagram illustrating another view of portable computer system 10 illustrated in FIGS. 1 and 2. In the embodiment illustrated in FIG. 3, display device 32 is shown disposed within recessed area 44. In the embodiment illustrated in FIG. 3, system 10 comprises a retractable cover 46 coupled to display member 14 and adapted to be disposed over exterior display device 32. For example, in the embodiment illustrated in FIG. 3, cover 46 is slidably disposed within a channel area 48 formed in display member 14 adjacent each side of display device 32 such that a user may slide cover 46 relative to display device 32 via a tab or gripping element 50 to cover or otherwise store display device 32 within display member 14, thereby substantially preventing or eliminating a likelihood of damage from occurring to display device 32. However, it should be understood that other types of cover devices or methods may be used to protect exterior display device 32.

Figure 4:
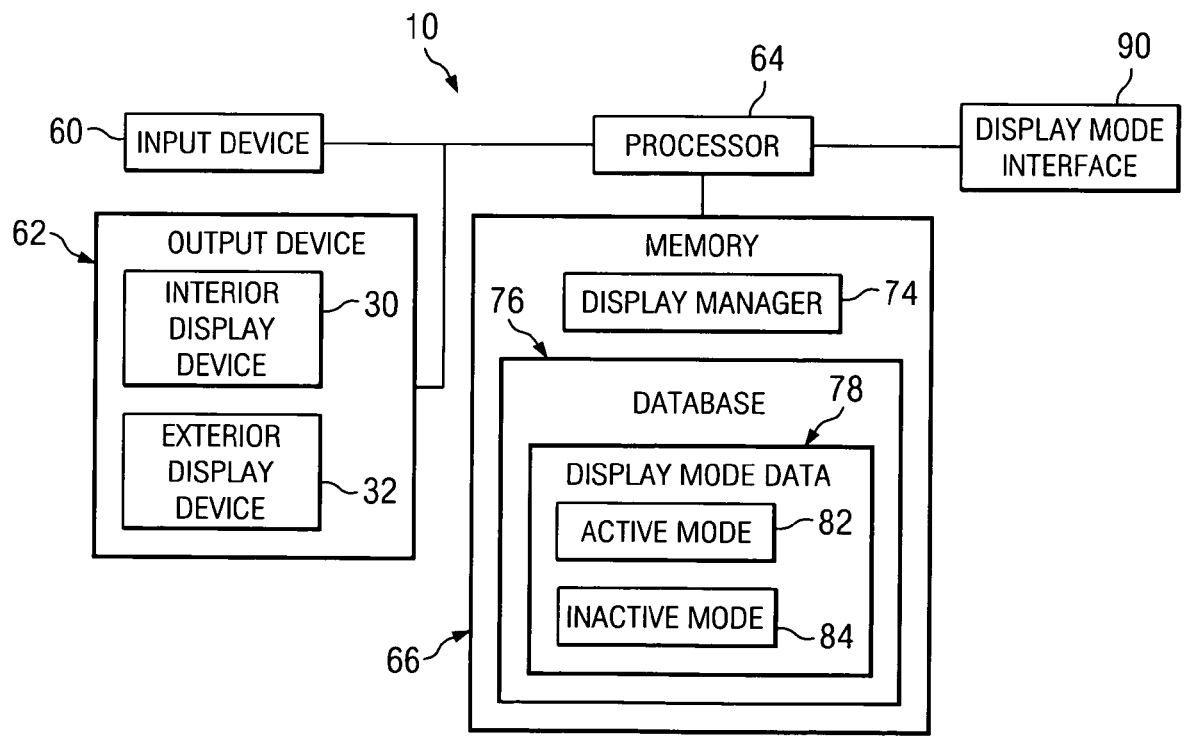
FIG. 4 is a block diagram illustrating an embodiment of the multi-display computer system illustrated in FIG. 1.

FIG. 4 is a block diagram illustrating an embodiment of portable computer system 10 in accordance with the present invention. In the embodiment illustrated in FIG. 4, system 10 comprises an input device 60, an output device 62, a processor 64, and a memory 66. Input device 60 may comprise any type of device for inputting information to system 10 such as, but not limited to, a keyboard 70 (as illustrated in FIG. 2), track pad, or a microphone. Output device 62 may comprise any type of device for outputting information from system 10 such as, but not limited to, interior display device 30, exterior display device 32, a speaker, or a printer.

In the embodiment illustrated in FIG. 4, a display manager 74 is stored in memory 66 so as to be accessible and executable by processor 64. Display manager 74 may comprise hardware, software, or a combination of hardware and software. In operation, display manager 74 enables a user of system 10 to automatically control a display mode of exterior display device 32 independent of a display mode of interior display device 30. For example, display manager 74 enables a user of system 10 to view image content on display device 30 while preventing the display of image content on an exposed or uncovered display device 32, thereby facilitating user control over the display of image content on display devices 30 and 32.

In the embodiment illustrated in FIG. 4, system 10 also comprises a database 76 having display mode data 78. Display mode data 78 comprises information associated with a display mode of interior display device 30 and/or exterior display device 32. For example, in the embodiment illustrated in FIG. 4, display mode data 78 comprises information associated with an active mode 82 and an inactive mode 84 for display devices 30 and/or 32. As used herein, an "active" mode of display device 30 or 32 refers to a display of image content on display device 30 and/or 32, and "inactive" mode refers to a sleep mode or other state of display device 30 and/or 32 in which image content is not displayed or otherwise viewable via display device 30 and/or 32.

In operation, display manager 74 enables a user to independently control a display mode of display device 30 and/or display device 32 to accommodate a desired presentation mode for image content displayed using system 10. For example, if the user desires to display image content only on interior display device 30, the user may change or set a display mode of exterior display device 32 to inactive mode 84, thereby preventing others from viewing image content on exterior display device 32. Additionally, if the user of system 10 desires to have image content displayed on exterior display device 32, the user may change inactive display mode 84 for exterior display device 32 to active mode 82 via display manager 74. Further, if the user desires to have image content displayed only on display device 32, the user may configure system 10 for inactive mode 84 for display device 30 and active mode 82 for display device 32 via display manager 74.

It should be understood that display manager 74 may be configured in a variety of different methods to accommodate user access and control. For example, in the embodiment illustrated in FIG. 4, system 10 comprises a display mode interface 90 adapted to be generated by display manager 74 and displayed on display device 30 and/or 32 to enable a user of system 10 to set, change, or otherwise modify a display mode of interior display device 30 and/or exterior display device 32. Display mode interface 90 may comprise a drop-down menu, selectable icon, or other type of displayed image such that the user of system 10 may select or otherwise modify a display mode associated with display device 30 and/or 32. Additionally, or alternatively, display manager 74 may be configured such that a user may change or set the display mode associated with display device 30 and/or 32 via a function key 92 (as illustrated in FIG. 2) of keyboard 70. For example, in operation, display manager 74 may be configured such that the user may toggle the display mode of exterior display device 32 from active mode 82 to inactive mode 84, and vice versa, by depressing a particular function key 92 of keyboard 70. However, it should be understood that system 10 may be otherwise configured to enable a user to independently control a display mode of either display device 30 and/or 32.

Thus, embodiments of the present invention enable a user to independently control viewing modes of display devices 30 and 32 to accommodate a desired viewing or presentation mode of image content via devices 30 and 32 and facilitate conservation of power generally required to display image content on devices 30 and 32. Additionally, embodiments of the present invention enable dual displays to be formed as part of a single display member 14 and enable protection of each display device 30 and 32 in a stored condition of system 10. For example, cover 46 may be disposed over display device 32 and display member 14 may be rotated to a closed position having interior surface 18 disposed against or proximate to surface 20 of base member 12, thereby having both display devices 30 and 32 in a stored and substantially protected condition.

What is claimed is:

1. A multi-display computer system, comprising:
   a display member rotatably coupled to a base member, the display member having a first display device disposed on an interior surface thereof, the display member having a second display device disposed in a recessed area of an exterior surface of the display member, the recessed area configured with a depth to accommodate placement of the second display device in the recessed area such that an exterior surface of the second display device is disposed below the exterior surface of the display member; and
   a display manager executable by a processor and adapted to enable a user to automatically control a display mode of the second display device independent of a display mode of the first display device.

2. The system of claim 1, wherein the at least one display mode of the second display device comprises an inactive display mode.

3. The system of claim 1, wherein the display manager is adapted to enable the user to control the display mode of the second display device via a function key of a keyboard of the computer system.

4. The system of claim 1, wherein the display manager is adapted to display an interface on the first display device to enable the user to control the display mode of the second display device.

5. The system of claim 1, wherein the display manager is adapted to change the display mode of the second display device from an active mode to an inactive mode.

6. The system of claim 1, wherein the display manager is adapted to change the display mode of the second display device from an inactive mode to an active mode.

7. The system of claim 1, wherein the second display device is rotatably coupled to the exterior surface of the display member.

8. The system of claim 1, wherein the second display device is coupled to the display member to enable a plurality of viewing orientations of the second display device relative to the display member.

9. The system of claim 1, further comprising a cover coupled to the display member and adapted to be disposed over the second display device.

10. The system of claim 1, wherein the display manager is adapted to enable an inactive display mode for the second display device during an active display mode for the first display device.

11. The system of claim 1, further comprising a retractable cover slidably coupled to the display member and adapted to be disposed over the second display device.

12. The system of claim 1, further comprising a recessed area formed in the display member for receiving the second display device.

13. A multi-display computer system, comprising:
a first display means disposed on an interior surface of a display member, the display member rotatably coupled to a base member;
a second display means disposed in a recessed area of an exterior surface of the display member, the recessed area configured with a depth to accommodate placement of the second display means in the recessed area such that an exterior surface of the second display means is disposed below the exterior surface of the display member; and
means for automatically controlling a display mode of the second display means independently of a display mode of the first display means.

14. The system of claim 13, wherein the means for controlling the display mode comprises means for enabling an inactive display mode for the second display means during an active display mode for the first display means.

15. The system of claim 13, wherein the means for controlling the display mode comprises means for changing the display mode of the second display means from an active mode to an inactive mode.

16. The system of claim 13, further comprising means for enabling the user to control the display mode of the second display means via a function key of a keyboard of the computer system.

17. The system of claim 13, further comprising means for displaying an interface on the first display device to enable the user to control the display mode of the second display device.

18. A computer display method, comprising:
controlling a display mode associated with a first display device, the first display device disposed on an interior surface of a display member; and
enabling automatic control of a display mode associated with a second display device disposed in a recessed area of an exterior surface of the display member, the recessed area configured with a depth to accommodate placement of the second display device in the recessed area such that an exterior surface of the second display device is disposed below the exterior surface of the display member, the automatic control of the display mode associated with the second device being independent of the display mode of the first display device.

19. The method of claim 18, further comprising maintaining an inactive display mode for the second display device during an active mode of the first display device.

20. The method of claim 18, further comprising changing the display mode of the second display device from an active mode to an inactive mode in response to a user request.

21. The method of claim 18, further comprising changing the display mode of the second, display device in response to a user request received via a function key of a keyboard.

22. The method of claim 18, further comprising displaying an interface on the first display device to enable a user to select the display mode for the second display device.

23. The method of claim 18, further comprising displaying an interface on the second display device to enable a user to select the display mode for the first display device.

24. The method of claim 18, further comprising maintaining an inactive display mode for the first display device during an active mode of the second display device.

25. A display device protection system for a computer system, comprising:
a display device disposed within a recessed area of a display member of the computer system; and
a retractable cover coupled to the display member and slidable over the display device.

26. The display device protection system of claim 25, further comprising a channel area formed adjacent to each side of the display device, the channel area enabling a user to slide the retractable cover over the display device.

27. The display device protection system of claim 25, further comprising a gripping element coupled to the retractable cover and configured to enable a user to slide the retractable cover relative to the display device.

28. The display protection system of claim 25, wherein the display device is coupled to a display member, the display member including a first surface, the first surface including the recessed area.

29. The display protection system of claim 28, wherein the recessed area is configured with a depth such that an external surface of the display device is disposed below the first surface.

30. The display protection system of claim 25, wherein the computer system includes a laptop computer.

31. The display protection system of claim 25, wherein the display device includes a liquid crystal display (LCD) device.

32. A display device protection system for a computer system, comprising:
means for displaying an image, the means for displaying being disposed within a recessed area of a display member of the computer system, wherein the means for displaying is coupled to a display member, the display member including a first surface, the first surface including the recessed area and wherein the recessed area is configured with a depth such that an external surface of the display device is disposed below the first surface; and
means for covering the means for displaying, the means for covering being coupled to the means for displaying, the means for covering being slidable over the means for displaying.

33. The display device protection system of claim 32, further comprising means for enabling a user to slide the means for covering over the means for displaying via a channel area formed adjacent to each side of the means for displaying device.

34. The display device protection system of claim 32, further comprising means for gripping coupled to the means for covering and configured to enable a user to slide the means for covering relative to the means for displaying.

35. The display protection system of claim 32, wherein the computer system includes a laptop computer.

36. The display protection system of claim 32, wherein the means for displaying includes a liquid crystal display (LCD) device.

* * * * *

UNITED STATES PATENT AND TRADEMARK OFFICE
CERTIFICATE OF CORRECTION

| | | |
|---|---|---|
| PATENT NO. | : 7,466,306 B2 | Page 1 of 1 |
| APPLICATION NO. | : 10/834148 | |
| DATED | : December 16, 2008 | |
| INVENTOR(S) | : Thomas J. Connor et al. | |

It is certified that error appears in the above-identified patent and that said Letters Patent is hereby corrected as shown below:

In column 4, line 44, in Claim 2, after "wherein" delete "the".

In column 5, line 65, in Claim 21, after "second" delete ",".

Signed and Sealed this

Twenty-third Day of June, 2009

JOHN DOLL
*Acting Director of the United States Patent and Trademark Office*